(12) United States Patent
Takahashi

(10) Patent No.: US 6,477,130 B2
(45) Date of Patent: Nov. 5, 2002

(54) OPTICAL PICK-UP APPARATUS

(75) Inventor: Yoshitaka Takahashi, Tokyo (JP)

(73) Assignee: Ricoh Company Ltd., Tokyo (JP)

(*) Notice: Subject to any disclaimer, the term of this patent is extended or adjusted under 35 U.S.C. 154(b) by 0 days.

(21) Appl. No.: 09/939,635

(22) Filed: Aug. 28, 2001

(65) Prior Publication Data

US 2002/0024920 A1 Feb. 28, 2002

Related U.S. Application Data

(63) Continuation of application No. 09/291,179, filed on Apr. 14, 1999, now Pat. No. 6,301,216.

(30) Foreign Application Priority Data

Apr. 14, 1998 (JP) .......................................... 10-102827

(51) Int. Cl.$^7$ ................................................ G11B 7/00
(52) U.S. Cl. ............................. 369/112.28; 369/112.01; 369/112.09
(58) Field of Search ........................ 369/44.23, 112.09, 369/44.24, 94, 112.01, 112.28

(56) References Cited

U.S. PATENT DOCUMENTS 6,084,845 A 7/2000 Mizuno
6,256,272 B1 * 7/2001 Yoon ..................... 369/112.28

FOREIGN PATENT DOCUMENTS

JP 06259804 6/1994

* cited by examiner

*Primary Examiner*—Nabil Hindi
(74) *Attorney, Agent, or Firm*—Dickstein Shapiro Morin & Oshinsky LLP

(57) ABSTRACT

The present invention provides a method and apparatus for utilizing light rays of differing wavelengths to read optical discs of different respective capacities. The present invention serves to prevent aberration of the minute optical spot used to read the respective optical discs and also serves to eliminate an offset component with respect to the signals received by the photo detector, as reflected from the respective optical discs.

36 Claims, 4 Drawing Sheets

OPTICAL PICK-UP APPARATUS

This application is a continuation of application Ser. No. 09/291,179, filed Apr. 14, 1999, now U.S. Pat. No. 6,301,216 the contents of which are incorporated herein by reference, and claims priority therefrom under 35 U.S.C. §120.

BACKGROUND OF THE INVENTION

1. Field of the Invention

The present invention relates to an optical pick-up apparatus with two light sources. More specifically, the present invention relates to an optical pickup apparatus capable of utilizing two respective light sources, each having a different wavelength, for reading two respective types of optical discs, and wherein, no photo detector adjustment is required in order to read each type of disk.

2. Description of the Related Art

FIG. 5 shows the general structure of a conventional optical pick-up apparatus. A light ray radiating from a laser diode 11 is collimated by a collimator lens 12 and its beam form is shaped by a beam shaping prism 13. It passes through a beam splitter 14 and is deflected 90 degrees by a deflective prism 15. It is then focused by an objective lens 16 and radiated on an optical disc 17 as a minute optical spot. Recording, reproducing and erasing information on the optical disc 17 are carried out by this optical spot.

A light ray reflected off of the optical disc 17 is collimated by the objective lens 16 again, and its path is deflected 90 degrees by the deflective prism 15. It is reflected by the beam splitter 14 and is focused by a focusing lens 18. Cylindrical lens 19 provides astigmatism and the light ray is received on photo detector 20. It is photo detector 20 that detects the information signal and the servo signal as used within the optical pick-up apparatus.

Recent attempts to increase optical disc capacity have led to the practice of shortening the wavelength of the light source used to read these higher capacity discs. In general, the illuminated spot radial on an optical disc is proportional to the wavelength λ of the light source used to read the disc, and the capacity of the optical disc is inversely proportional to the square of the wavelength λ. Notwithstanding the trend toward using shorter wavelengths, there do exist optical disc drives that depend on the longer wavelengths. For example, the disc drive might depend on a reflective rate of the optical disc and also on the recording power. In such instances, it is impossible to reproduce and record information on a conventional disc by using a light source with a shortened wavelength.

Accordingly, for the purpose of establishing compatibility between conventional discs and optical discs has larger capacities, an optical disc drive might have two different kinds of light sources. One light source has a short wavelength (e.g., 650 nm), the other light source has a conventional wavelength (e.g., 785 nm). The simplest way to realize such a combined disc drive is to employ two separate pick-up apparatuses, each of which employs a light source having a different wavelength. However, in this case, such a drive would become too large and too expensive to be practical.

On the other hand, both the size and cost of such a combined arrangement could be reduced if two separate light sources, each having a different wavelength, could be processed using one common optical arrangement.

FIG. 6 shows such a conventional optical pick-up apparatus. The optical parts depicted in FIG. 6 are common to those optical parts depicted within the optical pick-up device of FIG. 5, the only difference being the light source 21. For example, a first light source comprising a laser diode (LD) chip having a wavelength of 650 nm and a second light source comprising a laserdiode (LD) chip having a wavelength of 785 nm are separated by a very small distance which ranges from scores to hundreds of nanometers (nm). One light source, in the light source portion 21, is located on the optical axis of the collimator lens 12, a ray from this light source travels as a solid line of FIG. 6. The other light source, in the light source portion 21, is located such that it is slightly departed from the optical axis of the collimator lens 12, a ray from this light source travels as a dotted line of FIG. 6. These two light sources are used selectively.

For example, an optical information recording and reproducing apparatus, as disclosed in Japanese unexamined patent (KOKAI) No. 06-259804, comprises a first light source, a second light source, an optical beam composing means for composing rays from respective light sources on the same optical path, an optical arrangement which makes a beam from the first light source focused on the first optical disc and makes a beam from the second light source focused on the second optical disc, and photo detectors for receiving reflective rays from both the first optical disc and the second optical disc.

In the FIG. 6 optical pick-up apparatus, one light source, in the light source portion 21, is located on the optical axis of the collimator lens 12, the other light source in the light source portion 21, is located such that it is slightly departed from the optical axis of the collimator lens 12. A light ray radiating from the collimator lens 12, which is departed from its optical axis, is incident to the inclining of that light ray from the objective lens. Furthermore, since aberration occurs and it is difficult to form a good optical illuminated spot on the optical disc 17, and also, since two rays having different wavelengths reflected on the optical disc are incident to the converging lens 18 with different angles, the incident respective positions of the reflected light rays on the photo detector 20 are different. Therefore, when adjustments are made to the photo detector 20 for a light ray having one wavelength, a servo signal detected by the photo detector for a ray having a different wavelength necessarily has an offset component.

Thus, there exists a need for an apparatus and method which allows for the use of a single optical arrangement for utilizing light rays of differing wavelengths to read optical discs of different respective capacities, and wherein optical signals received by the photo detector as reflected from the respective optical discs do not contain an offset component.

SUMMARY OF THE INVENTION

The present invention overcomes the problems associated with the prior art and provides a method and apparatus for utilizing light rays of differing wavelengths to read optical discs of different respective capacities. The present invention serves to prevent aberration of the minute optical spot used to read the respective optical discs and also serves to eliminate an offset component with respect to the signals received by the photo detector, as reflected from the respective optical discs.

BRIEF DESCRIPTION OF THE DRAWINGS

These and other advantages and features of the invention will be more clearly understood from the following detailed description of the invention which is provided in connection with the accompanying drawings in which.

DETAILED DESCRIPTION OF PREFERRED EMBODIMENTS

Preferred embodiments of the present invention will now be described with reference to FIGS. 1–4. Other embodiments may be realized and structural or logical changes may be made to die disclosed embodiments without departing from the spirit or scope of the present invention.

Figure 1:
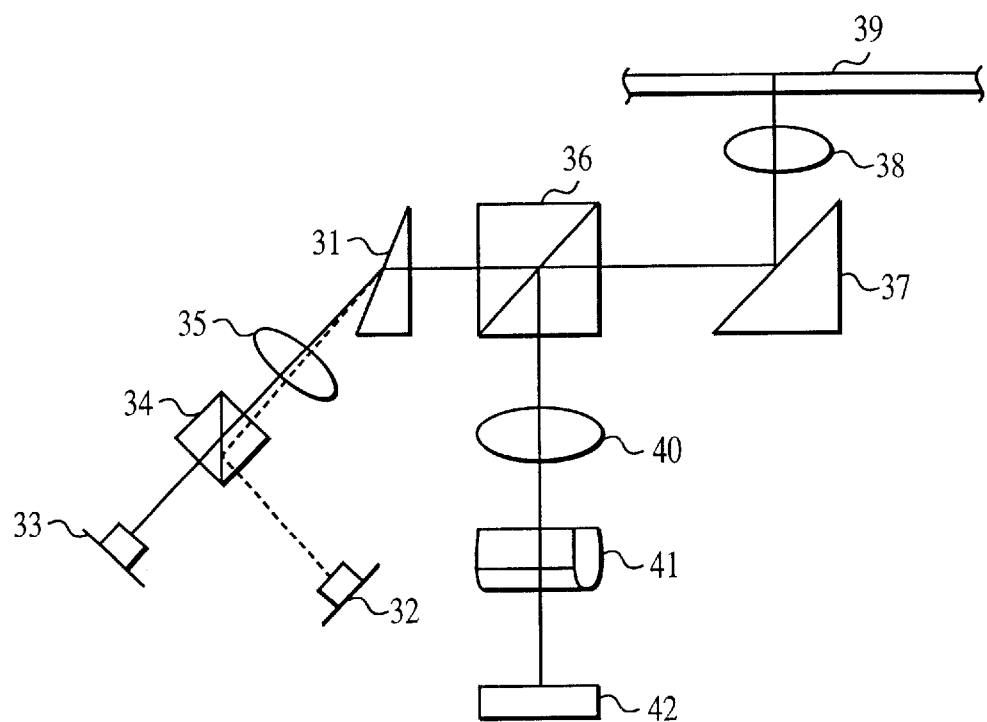
FIG. 1 depicts a first optical arrangement of the invention.

FIG. 1 depicts a first optical arrangement of the invention. The refractive index of optical glass, for a given light ray passing through it, varies with the wavelength of the light ray, and in general, if the light's wavelength is greater, the refractive index of the optical glass is lower.

Figure 3:
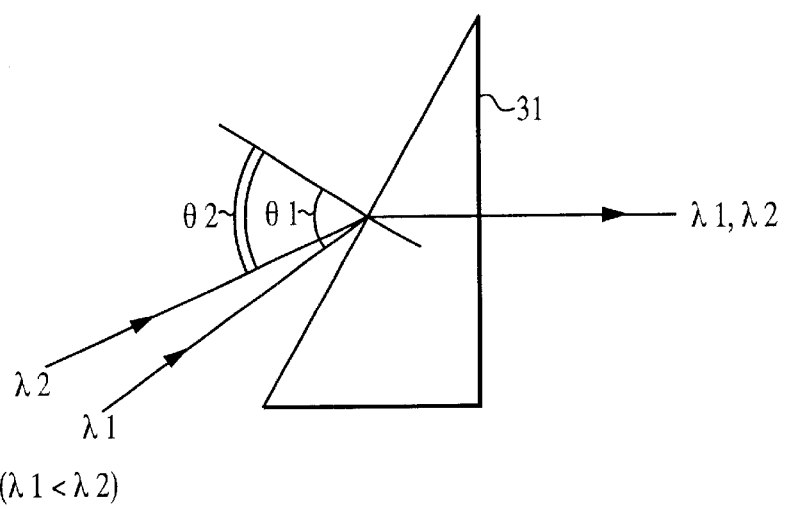
FIG. 3 depicts a portion of the FIG. 1 arrangement in more detail.

As shown in FIG. 3, two light sources 32, 33, having respective wavelengths $\lambda 1$ and $\lambda 2$, are located such that $\theta 1 > \theta 2$, where an angle in which the light of wavelength $\lambda 1$, from the first light source 32, is incident to the beam shaping prism 31 is $\theta 1$, and an angle in which the light of wavelength $\lambda 2$, from the second light source 33, is incident to the beam shaping prism 31 is $\theta 2$. In accordance with the present invention, a light with wavelength $\lambda 1$ and a light with wavelength $\lambda 2$ ($\lambda 1 < \lambda 2$) can be shaped by the beam shaping prism 31, wherein the angles with which the lights are radiated from the beam shaping prism 31 are nearly equal.

As depicted in FIG. 1, light rays from two separate light sources 32, 33 are composed by beam composing means 34 (e.g., a dichroic prism). Light from the prism 34 is then collimated by the collimator lens 35 and its beam form is shaped by the beam shaping prism 31. Upon leaving beam shaping prism 31, the light rays are radiated in nearly equal angles. The light rays then pass through the beam splitter 36 and then their path is deflected 90 degrees by the deflective prism 37 where the light is then radiated on the optical disc 39 as a minute optical spot that has been focused by the object lens 38. Recording, reproducing and erasing of information on the optical disc is carried out by the optical spot.

A reflective light from the optical disc 39 is collimated by the objective lens 38 and is again deflected 90 degrees by the deflective prism 37. The light is then reflected by the beam splitter 36 and is converged by the converging lens 40. Cylindrical lens 41 provides astigmatism and the light is then received by photo detector 42. An information signal and a servo signal are detected by the photo detector 42 for use within the optical pick-up apparatus.

In accordance with the present invention, the particular optical disc which is being read determines which light source (32 or 33) is active. For example, for the first optical disc, a first light source 32 is active and light source 33 is inactive. Similarly, for the second optical disc, a second light source 33 is active and light source 32 is inactive.

Still referring to FIG. 1, a pick-up apparatus is depicted in accordance with a first embodiment of the present invention. The pick-up apparatus has a first light source 32 which radiates a light of wavelength $\lambda 1$, and a second light source 33 which radiates a light of wavelength $\lambda 2$, where $\lambda 2$ is greater than $\lambda 1$. Light from each source 32, 33 then passes through composing means 34 (e.g., a dichroic prism) where the light rays are composed. Next, the light rays pass through a collimate lens 35 which collimates the lights from each respective source 32, 33. The lights then pass through a beam shaping prism 31 which shapes an optical beam form from the collimator lens 35. An objective lens 38 is employed for focussing light from the beam shaping prism 31 onto the optical disc 39. A photo detector 42 detects an information signal and servo signals by receiving light reflected from the optical disc 39.

The FIG. 1 pick-up apparatus focuses light from the first light source 32 on a first optical disc, and focuses light from the second light source 32 on a second optical disc, wherein the substrate thickness of the second optical disc differs from that of the first optical disc. As an angle in which light from the second light source 33 is incident to the beam shaping prism 31 is smaller than an angle in which light from the first light source 32 is incident to the beam shaping prism 31, the first light source 32 and the second light source 33 are located. Therefore, it is possible to make radiant angles of the beam shaping prism 31 for lights of the two different wavelengths $\lambda 1$, $\lambda 2$ nearly equal. Furthermore, an incident angle of the objective lens 38 for lights of the two different wavelengths $\lambda 1$, $\lambda 2$ is small, thereby reducing aberration of the optical spot for lights of the two different wavelengths $\lambda 1$, $\lambda 2$.

Figure 2:
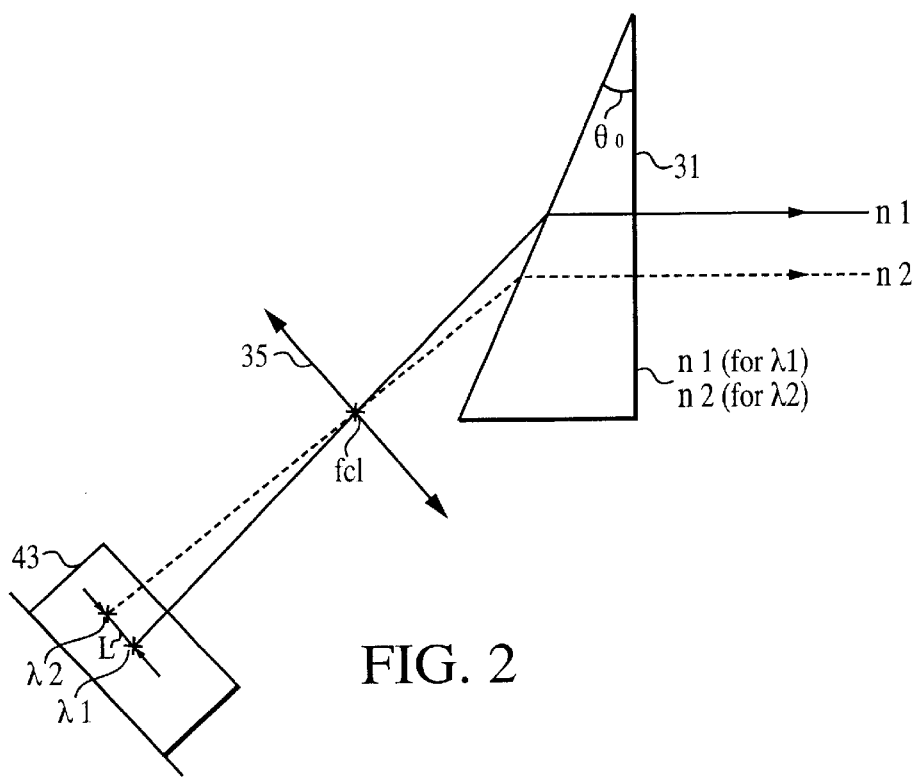
FIG. 2 depicts a portion of a second optical arrangement of the invention.

Turning now to FIG. 2, the portion of a second optical arrangement of the invention is depicted. In FIG. 2 embodiment, a single light source portion 43, having two laser diode chips in the same package is used, thereby eliminating a need for composing means 34. The two LD chips in this light source portion 43 comprise a first LD chip radiating a light of wavelength $\lambda 1$ and a second LD chip radiating a light of wavelength $\lambda 2$.

Lights of wavelength $\lambda 1$, $\lambda 2$ radiated from the two LD chips in the light source portion 43 are collimated by the collimate lens 35, and are shaped by the beam shaping prism 31. As can be seen in FIG. 3, an angle in which the light of wavelength $\lambda 1$, from the first light source 32, is incident to the beam shaping prism 31 is $\theta 1$. Similarly, an angle in which the light of wavelength $\lambda 2$, from the second light source 33, is incident to the beam shaping prism 31 is $\theta 2$. As long as $\theta 1 > \theta 2$, the two LD chips, located within the same light source portion 43, can respectively produce a light with wavelength $\lambda 1$ and a light with wavelength $\lambda 2$ (where $\lambda < \lambda 2$), wherein the two separate lights can be shaped by the beam shaping prism 31 such that respective angles radiated from the beam shaping prism 31 for both lights are nearly equal.

Defining an incident angle of the beam shaping prism 31 as $\theta 0$, a refractive index of material of the beam shaping prism 31 as n1 for wavelength $\lambda 1$ light, and n2 for wavelength $\lambda 2$ light, a focus distance of the collimator lens 35 as fc1, the distance between two LD chips in the light source portion 43 is L. Utilizing the above definitions, an optical arrangement of an embodiment of the invention is satisfied with the following expression:

$$L = fc1 \times \tan(\arcsin(n1 \times \sin \theta 0)) - (\arcsin(n2 \times \sin \theta 0)).$$

Therefore, radiating angles of the lights of two wavelengths $\lambda 1$, $\lambda 2$ are equal.

For example, where $\theta 0 = 32$ degrees, fc1=8, material of the beam shaping prism 31 is SF11, $\lambda 1=650$ nm, and $\lambda 2=785$ nm, n1 is 1.776653 and n2 is 1.765743, L=0.13 mm. That is, if the two LD chips in the light source portion 43 are located 0.13 mm apart, incident angles of the light of the two wavelengths λ1, λ2 for the objective lens 38 are nearly equal.

Still referring to FIG. 2, a second embodiment puts the first light source and the second light source in the same package. The first light source 32 and the second light source 33 are located in the light source portion 43. As long as an angle in which a light from the second light source 33 is incident to the beam shaping prism 31 is smaller than an angle in which a light from the first light source 32 is incident to the beam shaping prism 31, it is possible to make a radiant angle of the beam shaping prism for lights of the two wavelengths λ1, λ2 equal. Furthermore, incident angles of the objective lens for lights of the two wavelengths λ1, λ2 can be small and aberration of the minute optical spot for lights of the two wavelengths λ1, λ2 is reduced.

Figure 4:
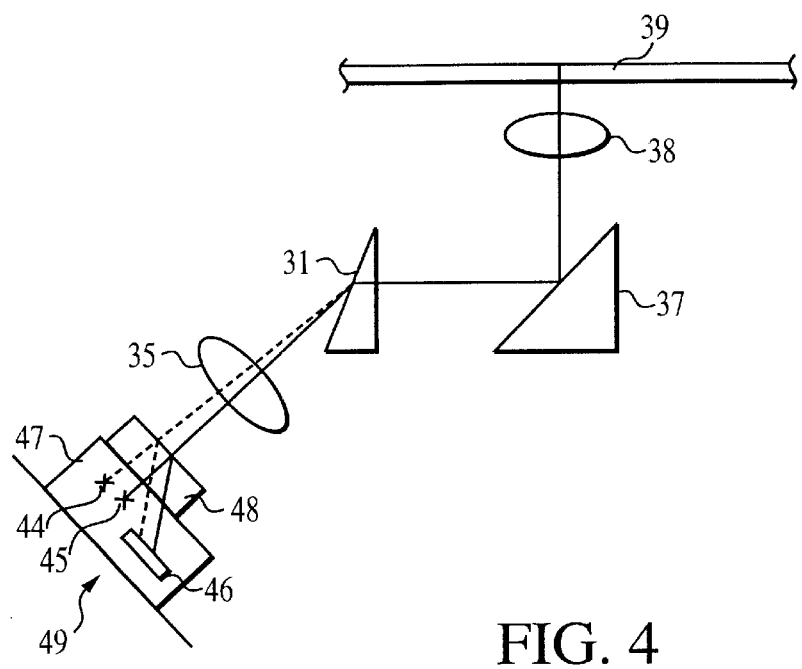
FIG. 4 depicts a portion of a third optical arrangement of the invention.
Figure 5:
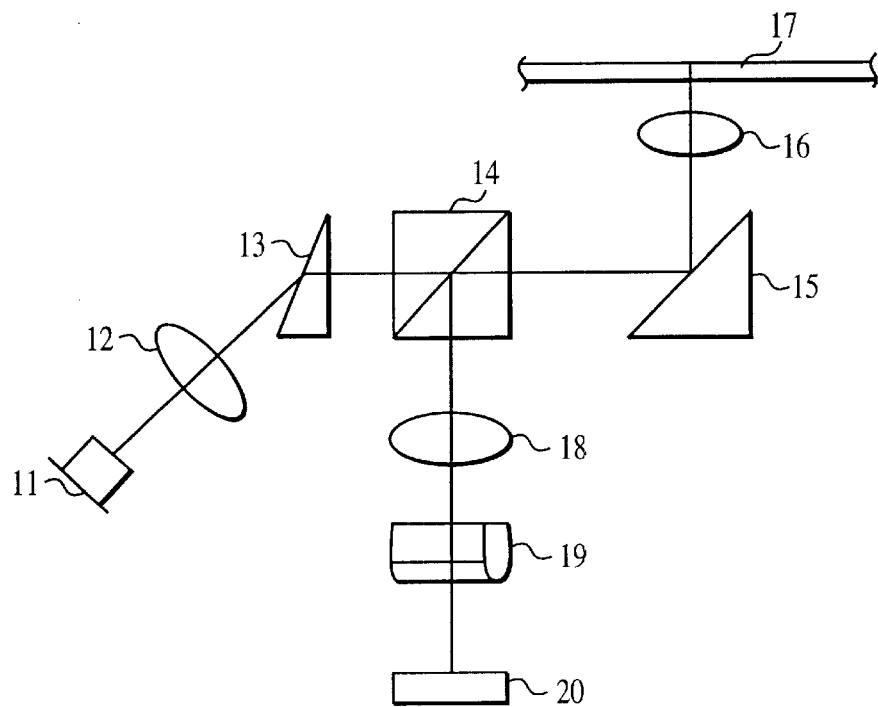
FIG. 5 depicts a conventional optical pick-up apparatus.
Figure 6:
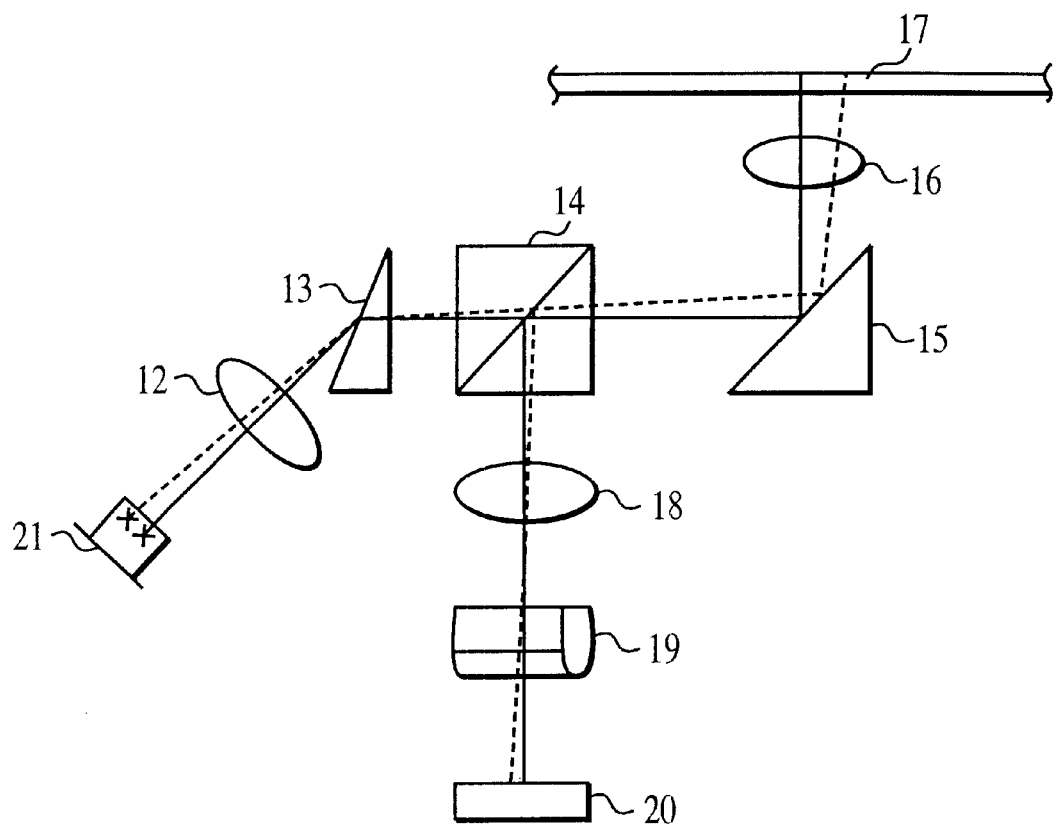
FIG. 6 depicts a conventional optical pick-up apparatus.

Turning now to FIG. 4, a portion of a third optical arrangement of the invention is depicted. The FIG. 4 embodiment puts two light sources 44, 45 and a photo detector 46 in the same package 47. A hologram laser unit 49 comprises hologram 48 as a diffraction grating, wherein the hologram 48 is coupled to the package 47. As depicted in FIG. 4, the light source 43, the beam splitter 36, the focusing lens 40, the cylindorical lens 41 and the photo detector 42 are omitted.

A light radiated from one of the two light sources 44, 45 in the hologram laser unit 49 passes through the hologram 48 and is collimated by the collimator lens 35. The beam form is shaped by the beam shaping prism 31 and its path is deflected 90 degrees by the deflective prism 37. The light is then focused by the object lens 38 and is radiated on the optical disc 39 as a minute optical spot. Recording, reproducing and erasing are carried out by the optical spot.

A reflective light from the optical disc 39 is the collimated by the objective lens 38 at which point, the optical path is deflected 90 degrees by the deflective prism 37. The light then passes through the beam shaping prism 31 and the collimator lens 35, and is diffracted by the hologram 48. Therefore, such optical path is separated from the radiating light path and is incident to the photo detector 46. An information signal and a servo signal are detected by photo detector 46. Therefore, it is possible to form a good optical spot on an optical disc while miniaturizing a drive by reducing the number of parts used in the disc drive. A cost savings is also realized through the incorporation of the present invention.

As is apparent from FIGS. 1 and 4, incident angles of the lights of wavelengths λ1, λ2 for the objective lens 38 can be zero degrees, however, incident angles of the lights of wavelengths λ1, λ2 for the collimator lens 35 cannot be zero degrees. Therefore, in each embodiment, one of the two light sources which radiates a short wavelength λ1 light for reproducing, recording and erasing information on a high density optical disc is located on the optical axis of the collimator lens 35. Therefore, it is possible to make the short wavelength 21 light be incident to the collimator lens 35 and the objective lens 38 in an ideal condition, thereby allowing for the forming of a good optical spot on the optical disc.

On the other hand, the long wavelength λ2 light is incident to the collimator lens 35 with inclination. In accordance with the present invention, the inclination of the incident angle for the long wavelength λ2 light to the collimator lens does not pose a problem because a permitted level of incident angle error of the long wavelength λ2 light for the collimator lens is greater than that of the incident angle error of the short wavelength λ1 light for the object lens. Therefore, the margin for aberration of the optical spot for purposes of reproducing, recording and erasing information is greater.

While preferred embodiments of the invention have been described and illustrated, it should be apparent that many modifications can be made to the invention without departing from its spirit or scope. For example, while specific exemplary wavelengths have been discussed in connection with preferred embodiments of the present invention, the invention may be employed for use with light rays having wavelengths different than those depicted herein. Accordingly, the invention is not limited by the foregoing description or drawings, but is only limited by the scope of the appended claims.

What is claimed as new and desired to be protected by Letters Patent of the United States is:

1. A system for use with optical disk reproduction, the system comprising:

a beam shaping prism, a light entry portion of said beam shaping prism being located at a convergence point of first and second light rays received from each of at least first and second light sources, said first light source producing light rays of a first wavelength, said second light source producing light rays of a second wavelength, said second wavelength being greater than said first wavelength, wherein an angle with which said light rays of said first wavelength are incident to said beam shaping prism is greater than an angle with which said light rays of said second wavelength are incident to said beam shaping prism, and wherein respective angles of said first and second light rays are nearly equal upon said light rays exiting said beam shaping prism.

2. The system as in claim 1 further comprising:

beam composing means, said beam composing means being located such that it is capable of alternatively passing light rays received from each of at least said first and second light sources from respective light entry portions of said beam composing means to a light exiting portion of said beam composing means, wherein said first and second light rays exit said beam composing means in respective exit angles such that they would converge at said convergence point located at a predetermined distance from said beam composing means.

3. The system as in claim 2 further comprising a collimator lens located between said beam composing means and said beam shaping prism for collimating said first and second light rays before said light rays enter said beam shaping prism.

4. The system as in claim 1 further comprising a beam splitter located such that said first and second light rays enter a light entry portion of said beam splitter upon exiting said beam shaping prism.

5. The system as in claim 4 further comprising a deflective prism for deflecting a path of said first and second light rays, said deflective prism being located such that said first and second light rays are deflected upon exiting said beam splitter.

6. The system as in claim 5, wherein said deflective prism is capable of deflecting a path of said first and second light rays by 90 degrees.

7. The system as in claim 5 further comprising an optical disc from which said first and second light rays are reflected after said light rays have been deflected by said deflective prism.

8. The system as in claim 7 further comprising an object lens for focusing said first and second light rays onto said optical disc after they have been deflected by said deflective prism.

9. The system as in claim 7 further comprising a photo detector for detecting an information signal and servo signals by receiving said first and second light rays as reflected from said optical disc.

10. The system as in claim 7 further comprising a cylindrical lens for providing astigmatism of said first and second reflected light rays before said reflected light rays are received by said photo detector.

11. The system as in claim 10, wherein said first and second reflected light rays are reflected by said beam splitter before said reflected light rays are received by said cylindrical lens.

12. The system as in claim 11 further comprising a convergent lens for converging said first and second reflected light rays before said reflected light rays are received by said cylindrical lens.

13. The system as in claim 11, wherein said first and second reflected light rays are deflected by said deflective prism before said reflected light rays are reflected by said beam splitter.

14. The system as in claim 13, wherein said deflective prism deflects a path of said first and second reflected light rays by 90 degrees.

15. The system as in claim 13, wherein said first and second reflected light rays are collimated by said objective lens before said reflected light rays are deflected by said deflective prism.

16. The system as in claim 2, wherein said beam composing means comprises a dichroic prism.

17. The system as in claim 1, wherein said light sources further comprise laser diodes.

18. The system as in claim 11, wherein said first wavelength is approximately 650 nm.

19. The system as in claim 1, wherein said second wavelength is approximately 785 nm.

20. The system as in claim 3, wherein said first light rays are passed through an optical axis of said collimator lens.

21. A method of reproducing an optical disc, the method comprising:
   receiving light rays from a plurality of light sources at a beam shaping prism, a first one of said plurality of light sources producing light rays of a first wavelength, a second one of said plurality of light sources producing light rays of a second wavelength, said second wavelength being greater than said first wavelength;
   passing said first and second light rays through a beam shaping prism, a light entry portion of said beam shaping prism being located at a convergence point of said first and second light rays, wherein
      an angle with which said light rays of said first wavelength are incident to said beam shaping prism is greater than an angle with which said light rays of said second wavelength are incident to said beam shaping prism, and wherein
      respective angles of said first and second light rays are nearly equal upon said light rays exiting said beam shaping means.

22. The method as in claim 21 further comprising:
   receiving light rays from said first and second light sources at a beam composing means; and
   passing said light rays from said first and second light sources from respective light entry portions of said beam composing means to a light exiting portion of said beam composing means, wherein said first and second light rays exit said beam composing means in respective angles such that they converge at said convergence point located at a predetermined distance from said beam composing means.

23. The method as in claim 22 further comprising collimating said first and second light rays upon exiting said beam composing means and before said light rays enter said beam shaping prism.

24. The method as in claim 22 further comprising passing said first and second light rays through a beam splitter upon said rays exiting said beam shaping prism.

25. The method as in claim 24 further comprising deflecting a path of said first and second light rays into a direction of an optical disc.

26. The method as in claim 25 further comprising reflecting one of said first and second light rays off of said optical disc.

27. The method as in claim 26 further comprising focusing said first and second light rays onto said optical disc after said first and second light rays have been deflected.

28. The method as in claim 26 further comprising receiving said reflected light rays at a photo detector.

29. The method as in claim 28 further comprising providing astigmatism of said reflected light rays before said reflected light rays are received at said photo detector.

30. The method as in claim 29 further comprising reflecting said reflected light rays off of said beam splitter before said reflected light rays are provided with astigmatism.

31. The method as in claim 30 further comprising converging said reflected light rays before said reflected light rays are provided with astigmatism.

32. The method as in claim 30 further comprising deflecting a path of said reflected light rays before said reflected light rays are reflected by said beam splitter.

33. The method as in claim 32 further comprising collimating said reflected light rays before said reflected light rays are deflected.

34. The method as in claim 23, wherein said act of collimating further comprises passing said first light rays through an optical axis of a collimator lens.

35. A beam shaping prism for use with optical disk reproduction, said beam shaping prism comprising:
   a light entry portion for being positioned at a convergence point of first and second light rays received from each of at least first and second light sources, said first light source producing light rays of a first wavelength, said second light source producing light rays of a second wavelength, said second wavelength being greater than said first wavelength; and
   a light exiting portion, wherein respective angles of said first and second light rays are nearly equal upon said light rays exiting said beam shaping prism when an angle with which said light rays of said first wavelength are incident to said light entry portion is greater than an angle with which said light rays of said second wavelength are incident to said light entry portion.

36. A beam shaping prism for use with optical disk reproduction, said beam shaping prism comprising:
   a light entry portion for being positioned at a predetermined distance beyond a convergence point of first and second light rays received from each of at least first and second light sources, said first light source producing light rays of a first wavelength, said second light source producing light rays of a second wavelength, said second wavelength being greater than said first wavelength; and
   a light exiting portion, wherein respective angles of said first and second light rays are nearly equal upon said light rays exiting said beam shaping prism when an angle with which said light rays of said first wavelength are incident to said light entry portion is greater than an angle with which said light rays of said second wavelength are incident to said light entry portion.

* * * * *